(12) United States Patent
Yuasa et al.

(10) Patent No.: US 11,377,067 B2
(45) Date of Patent: Jul. 5, 2022

(54) BUSH

(71) Applicant: KABUSHIKI KAISHA TOKAI-RIKA-DENKI-SEISAKUSHO, Aichi-ken (JP)

(72) Inventors: Kaoru Yuasa, Aichi-ken (JP); Giko Makino, Aichi-ken (JP)

(73) Assignee: KABUSHIKI KAISHA TOKAI-RIKA-DENKI-SEISAKUSHO, Aichi (JP)

(*) Notice: Subject to any disclaimer, the term of this patent is extended or adjusted under 35 U.S.C. 154(b) by 434 days.

(21) Appl. No.: 16/509,769

(22) Filed: Jul. 12, 2019

(65) Prior Publication Data
US 2020/0025249 A1 Jan. 23, 2020

(30) Foreign Application Priority Data
Jul. 20, 2018 (JP) .............................. JP2018-136534

(51) Int. Cl.
*B60R 22/18* (2006.01)
*B60R 22/26* (2006.01)
*F16C 33/08* (2006.01)

(52) U.S. Cl.
CPC .............. *B60R 22/26* (2013.01); *B60R 22/18* (2013.01); *F16C 33/08* (2013.01); *F16C 2326/08* (2013.01); *Y10T 16/05* (2015.01)

(58) Field of Classification Search
CPC . B60R 22/18; B60R 22/26; B60R 2022/1818; B60R 2022/1831
See application file for complete search history.

(56) References Cited

U.S. PATENT DOCUMENTS

| | | | | |
|---|---|---|---|---|
| 5,762,371 | A * | 6/1998 | Noguchi | B60R 22/203 280/801.2 |
| 11,142,163 | B2 * | 10/2021 | Morgan | B60R 22/24 |
| 2005/0012321 | A1 * | 1/2005 | Moendel | B60R 22/18 280/808 |
| 2005/0173916 | A1 * | 8/2005 | Sugimoto | B60R 22/203 280/801.1 |
| 2008/0043374 | A1 | 2/2008 | Hanrahan et al. | |
| 2008/0061179 | A1 | 3/2008 | Yoshida et al. | |
| 2015/0210246 | A1 * | 7/2015 | You | B60R 22/24 242/397.5 |

(Continued)

FOREIGN PATENT DOCUMENTS

| | | |
|---|---|---|
| JP | S57-109845 U | 7/1982 |
| JP | S59-075913 U | 5/1984 |

(Continued)

*Primary Examiner* — Barry Gooden, Jr.
(74) *Attorney, Agent, or Firm* — Roberts Calderon Safran & Cole P.C.

(57) ABSTRACT

Entanglement of bush main bodies is suppressed. At a bush, a shaft portion of a bush main body, which extends in a circumferential direction of a mounting hole of an outer anchor, covers a peripheral surface of the mounting hole. A first flange portion and a second flange portion of the bush main body are placed on an front and back sides of the outer anchor, respectively. Moreover, a connection portion connects both circumferential direction sides of the bush main body. The connection portion allows elastic deformation of a diameter of the bush main body, and the second flange portion can pass-through the mounting hole.

11 Claims, 6 Drawing Sheets

(56) References Cited

U.S. PATENT DOCUMENTS

2021/0101560 A1* 4/2021 Morgan ................. B60R 22/24

FOREIGN PATENT DOCUMENTS

| JP | 61-014153 U | | 1/1986 | | |
| JP | 2007084060 A | * | 4/2007 | ............ | B60R 22/24 |
| JP | 2008-068649 A | | 3/2008 | | |
| WO | WO-2004050436 A1 | * | 6/2004 | ............ | C22C 38/02 |
| WO | WO-2015092891 A | * | 6/2015 | ............ | B60R 22/24 |

* cited by examiner

BUSH

CROSS-REFERENCE TO RELATED APPLICATION

This application is based on and claims priority under 35 USC 119 from Japanese Patent Application No. 2018-136534 filed on Jul. 20, 2018, the disclosure of which is incorporated by reference herein.

BACKGROUND

Technical Field

The present invention relates to a bush at which a shaft portion and a pair of flange portions are provided.

Related Art

In the soundproof supporting device of following Japanese Utility Model Application Laid-Open (JP-U) No. S61-14153, a shaft portion of a soundproof bush covers the peripheral surface of a mounting bolt hole of an anchor hardware, and a pair of flange portions of the soundproof bush cover the front and back sides of the anchor hardware respectively. Further, a cut-out is formed in a circumferential direction portion of the soundproof bush. Due to the cut-out permitting elastic deformation of the diameter of the soundproof bush, the flange portions of the soundproof bush are passed-through the mounting bolt hole, and the soundproof bush is assembled to the anchor hardware. Here, in this soundproof supporting device, there is the possibility that soundproof bushes will become entangled with one another due a soundproof bush passing-through the cut-out of another soundproof bush.

In view of the aforementioned, an object of the present invention is to provide a bush that can suppress an entanglement between bush main bodies.

SUMMARY

A bush of a first aspect of the present invention has: a bush main body that extends in a circumferential direction of a mounting hole of a supporting part of a seatbelt device, the bush main body including a shaft portion that covers a peripheral surface of the mounting hole and a pair of flange portions that cover front and back sides of the supporting part, respectively, and, due to a mounting member being inserted-through an interior of the bush main body and being mounted to a part of a vehicle body, the supporting part is supported at the part of the vehicle body; and a connection portion that connects both circumferential direction sides of the bush main body, and allows elastic deformation of a diameter of the bush main body, and makes passage of the flange portions through the mounting hole possible.

In a bush of a second aspect of the present invention, in the bush of the first aspect of the present invention, elastic deformation of the diameter of the bush main body is allowed by the connection portion breaking.

In a bush of a third aspect of the present invention, in the bush of the second aspect of the present invention, elastic deformation of the diameter of the bush main body is allowed by the connection portion elastically deforming.

In a bush of a fourth aspect of the present invention, in the bush of the third aspect of the present invention, the connection portion connects axial direction intermediate portions of both circumferential direction sides of the shaft portion.

In the bush of the first aspect of the present invention, the bush main body extends in the circumferential direction of a mounting hole of a supporting part of a seatbelt device. The shaft portion of the bush main body covers the peripheral surface of the mounting hole, and the pair of flange portions of the bush main body cover the front and back sides of the supporting part, respectively. Moreover, due to the mounting member being inserted-through the bush main body interior and being mounted to the part of the vehicle body, the supporting part is supported at the part of the vehicle body.

Here, the connection portion connects the both circumferential direction sides of the bush main body. The connection portion allows elastic deformation of the diameter of the bush main body, and the flange portions of the bush main body can be passed-through the mounting hole. Therefore, another bush main body passing-through between the both circumferential direction sides of the bush main body can be suppressed by the connection portion, and entangling of bush main bodies can be suppressed.

In the bush of the second aspect of the present invention, the connection portion is broken, and elastic deformation of the diameter of the bush main body is allowed. Therefore, the connection portion can appropriately allow elastic deformation of the diameter of the bush main body.

In the bush of the third aspect of the present invention, the connection portion is elastically deformed, and elastic deformation of the diameter of the bush main body is allowed. Therefore, the connection portion can appropriately allow elastic deformation of the diameter of the bush main body.

In the bush of the fourth aspect of the present invention, the connection portion connects the axial direction intermediate portions of the both circumferential direction sides of the shaft portion. Therefore, the connection portion can effectively allow elastic deformation of the diameter of the bush main body.

BRIEF DESCRIPTION OF THE DRAWINGS

Exemplary embodiments of the present invention will be described in detail based on the following figures, wherein.

DETAILED DESCRIPTION

First Embodiment

A bush 10 relating to a first embodiment of the present invention is described hereinafter by using FIG. 1 through FIG. 5.

Figure 1:
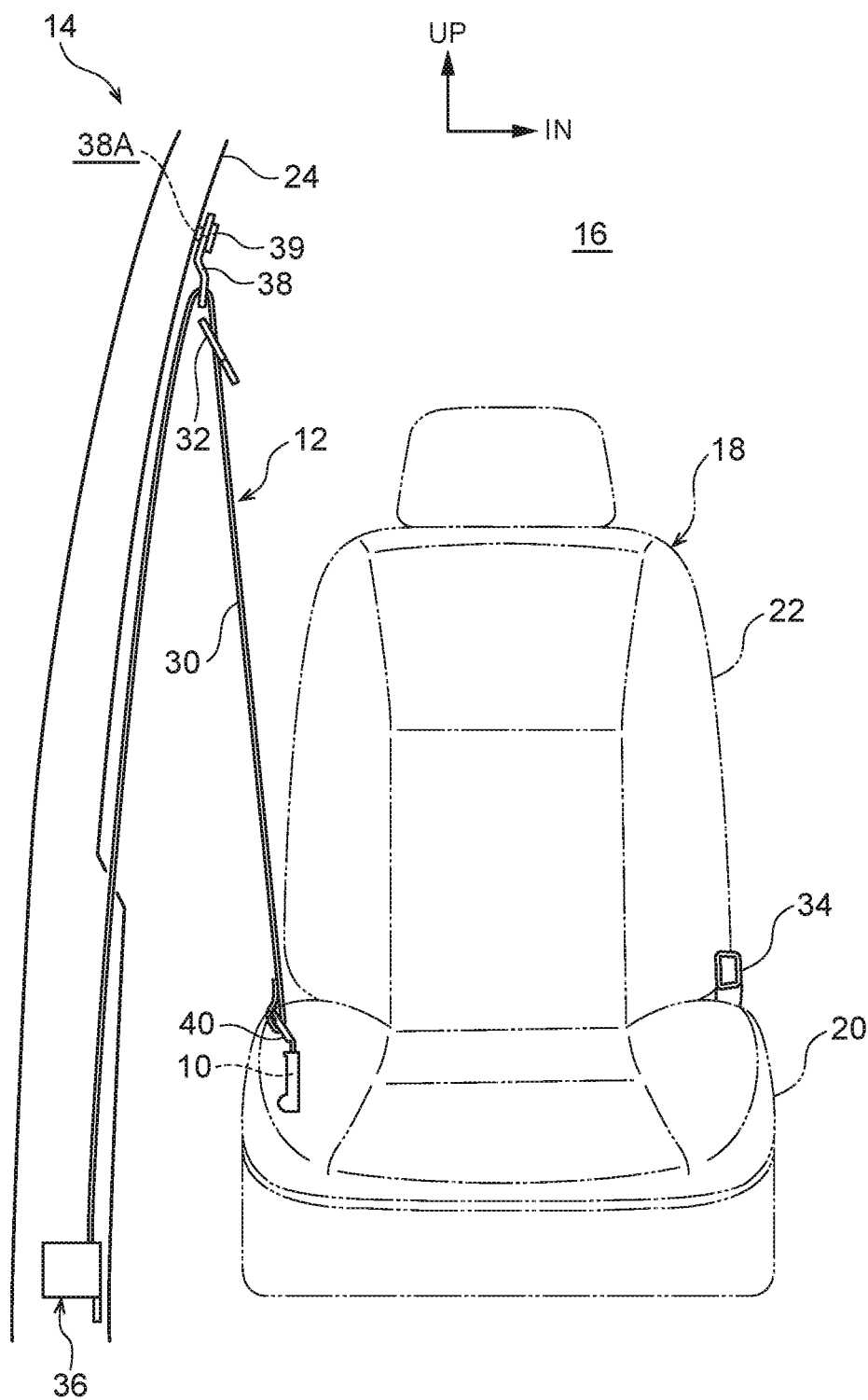
FIG. 1 is a front view in which a seatbelt device, to which a bush relating to a first embodiment of the present invention is applied, is seen from a vehicle front side.

A seatbelt device 12, to which the bush 10 relating to the first embodiment of the present invention is applied, is shown in FIG. 1. Note that, in the drawings, the vehicle front side is denoted by arrow FR, the vehicle transverse direction inner side is denoted by arrow IN, and the vehicle upper side is denoted by arrow UP.

The seatbelt device 12 is provided at a vehicle seat 18 (e.g., the driver's seat or the front passenger's seat). The vehicle seat 18 is disposed within a vehicle cabin 16 of a vehicle 14, and a vehicle occupant can sit in the vehicle seat 18. The vehicle seat 18 is structured to include a seat cushion 20 that is at the vehicle lower side. The seat cushion 20 supports the buttocks and the thighs of the vehicle occupant (not shown). Further, the vehicle seat 18 is structured to include a seatback 22 that is at the vehicle rear side. The seatback 22 supports the back portion of the vehicle occupant.

A retractor 36 is provided at the seatbelt device 12. The retractor 36 is disposed at the lower portion of a center pillar 24 that is at the vehicle transverse direction outer side of the vehicle seat 18.

The retractor 36 has a spool (not illustrated). A webbing (seatbelt) 30 is taken-up by urging force onto the spool in the form of layers from a length direction one end side of the webbing 30. Further, a shoulder anchor 38 (through-anchor) is disposed at the center pillar 24 at further toward the vehicle upper side than the position of the shoulders of the vehicle occupant. A supporting shaft mounting hole 38A is formed to so as to pass-through the vehicle upper side of the shoulder anchor 38.

A supporting shaft (bolt) 39 is inserted-through the supporting shaft mounting hole 38, and the supporting shaft 39 is fixed to the center pillar 24. Therefore, the shoulder anchor 38 can rotate around the supporting shaft 39. The webbing 30 is pulled-out toward the vehicle upper side from the retractor 36, and is inserted-through the shoulder anchor 38, and is folded-over toward the vehicle lower side.

A length direction another end portion of the webbing 30 is anchored on an outer anchor 40 that is made of a metal and serves as a supporting part. The outer anchor 40 is formed in the shape of a plate, and a mounting hole 46 (see FIG. 2) is provided in the central portion of the vehicle lower side of the outer anchor 40. The mounting hole 46 is formed so as to pass-through along the thickness direction of the outer anchor 40. A bolt 48 (see FIG. 2) that serves as a mounting member is inserted through the mounting hole 46, and the bolt 48 is fastened to a bracket (not shown) that is provided at the seat cushion 20. Due thereto, the outer anchor 40 is nipped between the head portion of the bolt 48 and the bracket, and is rotatably supported at the seat cushion 20.

Figure 2:
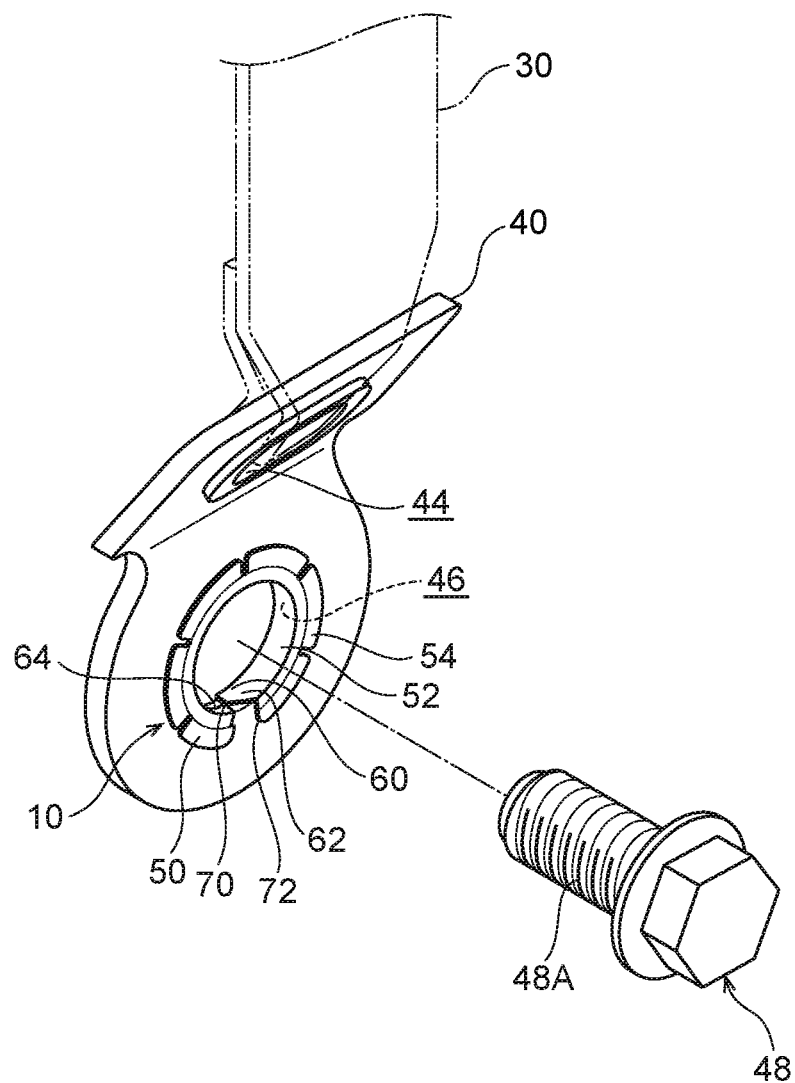
FIG. 2 is a perspective view in which an outer anchor, which structures the seatbelt device in the first embodiment of the present invention, is seen from a vehicle lateral side.

As shown in FIG. 2, an insert-through hole 44 that is rectangular is formed so as to pass-through the vehicle upper side of the outer anchor 40. The another end portion of the webbing 30 is inserted-through the insert-through hole 44. The another end portion of the webbing 30 is inserted-through the insert-through hole 44 and is folded over, and is sewn to a vicinity of the another end portion of the webbing 30. Due thereto, the another end portion of the webbing 30 is supported at the outer anchor 40 at the vehicle rear side and the vehicle transverse direction outer side end portion of the seat cushion 20 (see FIG. 1).

The above-described mounting hole 46 of the outer anchor 40 is formed in a circular shape so as to pass-through along the thickness direction of the outer anchor 40 (the vehicle transverse direction). The bush 10 that is made of resin is assembled to the inner circumferential side of the mounting hole 46. A bush main body 50 is provided at the bush 10. A shaft portion 52 is formed at the radial direction central side of the bush main body 50. The shaft portion 52 is formed in the shape of a curved plate that is C-shaped in cross-section, and extends along the circumferential direction of the mounting hole 46. The shaft portion 52 covers the peripheral surface of the mounting hole 46.

A first flange portion 54 and a second flange portion 56 that serve as flange portions are formed at the axial direction both end portions of the shaft portion 52, respectively. The first flange portion 54 and the second flange portion 56 are placed on the front and back sides of the outer anchor 40, respectively.

The first flange portion 54 and the second flange portion 56 are formed in the shapes of C-shaped plates that are coaxial with the shaft portion 52. The first flange portion 54 and the second flange portion 56 project-out from the vehicle transverse direction outer side end portion of the shaft portion 52 toward the radial direction outer side. The outer diameter of the first flange portion 54 is large as compared with the outer diameter of the second flange portion 56. A first cut-out portion 72 and a second cut-out portion 74 are formed in circumferential direction portions of the first flange portion 54 and the second flange portion 56, respectively.

Figure 3:
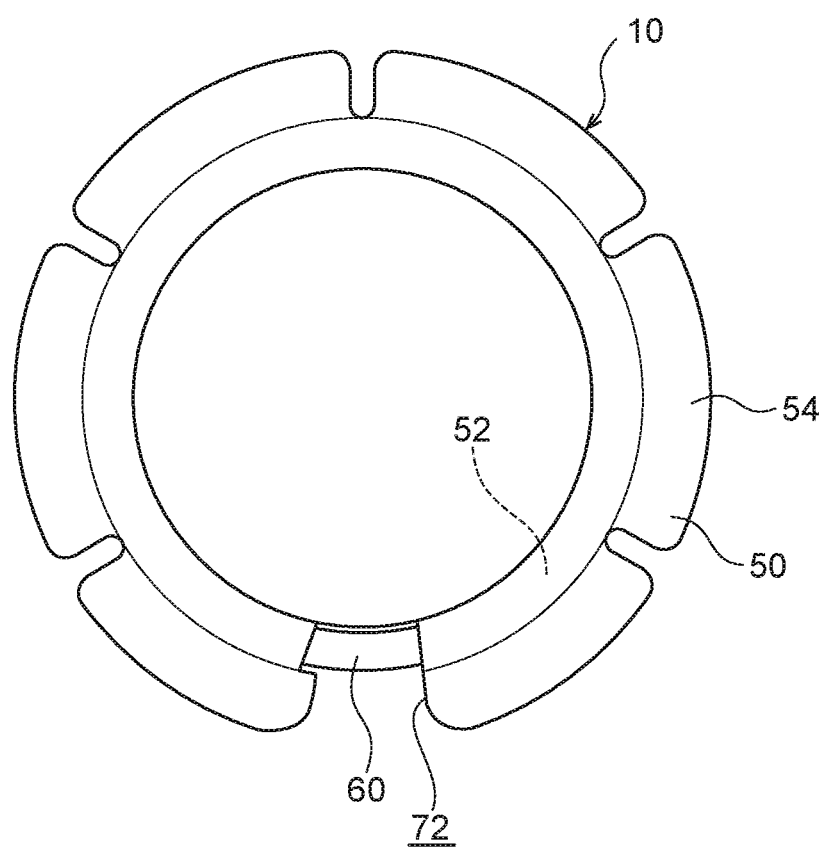
FIG. 3 is a plan view of the bush relating to the first embodiment of the present invention.
Figure 4:
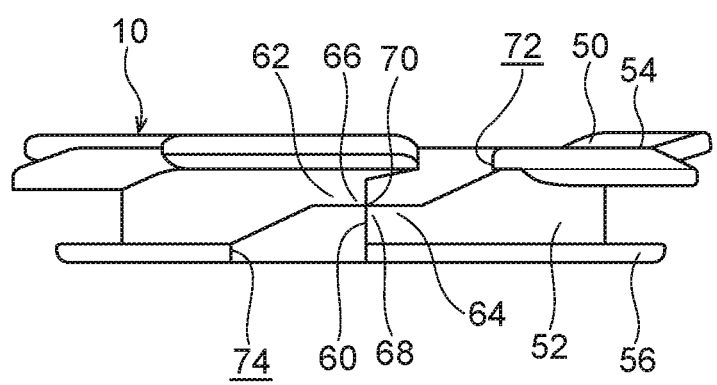
FIG. 4 is a side view of the bush relating to the first embodiment of the present invention.

As shown in FIG. 3 and FIG. 4, a connection portion 60 is formed integrally between the circumferential direction both ends of the shaft portion 52. The connection portion 60 connects the circumferential direction both ends of the shaft portion 52. At the connection portion 60, a first connected portion 62 and a second connected portion 64 are connected at the axial direction central portion of the shaft portion 52. The first connected portion 62 extends from a circumferential direction one end portion toward another end portion side of the shaft portion 52, at the first flange portion 54 side. Further, the second connected portion 64 extends, from the circumferential direction another end portion toward the one end portion side of the shaft portion 52, at the second flange portion 56 side.

A joined portion 70 is formed at the shaft portion 52 circumferential direction central portion of the connection portion 60. The joined portion 70 joins the corner portion, which is at the second connected portion 64 side of a first distal end portion 66 that is at the distal end portion of the first connected portion 62, and the corner portion, which is at the first connected portion 62 side of the distal end portion of the second connected portion 64. At the time of assembling the bush 10 to the outer anchor 40, the joined portion 70 of the connection portion 60 can be broken, and, due to the diameter of the bush main body 50 being elastically contracted, the second flange portion 56 (or the first flange portion 54) is passed-through the mounting hole 46, and thereafter, the bush main body 50 is elastically restored.

The bush 10 suppresses contact between the outer anchor 40, and the bolt 48 and the bracket. The bush 10 suppresses the generation of abnormal noise between the outer anchor 40, and the bolt 48 and the bracket, and suppresses corrosion that is due to the different types of metal of the outer anchor 40, and the bolt 48 and the bracket. Further, the bush 10 improves the slidability of the outer anchor 40 with respect to the bolt 48 and the bracket.

A tongue plate 32 is movably attached to the webbing 30 between the shoulder anchor 38 and the outer anchor 40. Further, a buckle 34 (inner anchor) is anchored to the vehicle rear side and vehicle transverse direction inner side end portion of the seat cushion 20.

Namely, a mounting hole (not shown) is formed so as to pass-through the buckle 34, and a supporting shaft (a bolt, not illustrated) is inserted-through the mounting hole, and the supporting shaft is fixed to the seat cushion 20. The vehicle occupant who is seated in the vehicle seat 18 puts on the webbing 30 by engaging the tongue plate 32 with the buckle 34.

Operation and effects of the present embodiment are described next.

In accordance with the bush 10 relating to the present embodiment, before the bush 10 is assembled to the mounting hole 46 of the outer anchor 40, the connection portion 60 connects the both circumferential direction sides of the shaft portion 52. Therefore, for example, in a case in which a large number of the bushes 10 are accommodated in a parts feeder or the like, the connection portion 60 can keep another bush 10 from passing-through between the both circumferential direction sides of the bush main body 50, and can suppress entangling of the bushes 10 (the bush main bodies 50). Due thereto, at the time when the bush 10 is assembled to the mounting hole 46, the need to carry out work for disentangling entanglements of the bushes 10 can be eliminated, and therefore, the ability to assemble the bush 10 to the outer anchor 40 can be improved.

Figure 5:
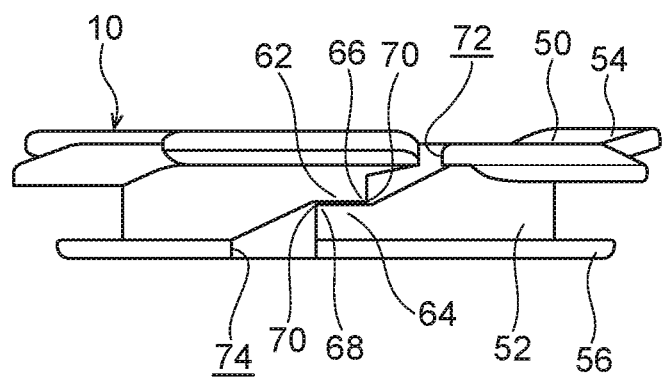
FIG. 5 is a side view showing a state in which the diameter of the bush relating to the first embodiment of the present invention is elastically contracted.

Moreover, in accordance with the bush 10 relating to the present embodiment, the joined portion 70 of the connection portion 60 connects the axial direction central portions of the both circumferential direction sides of the shaft portion 52. Therefore, as shown in FIG. 5, regardless of from which axial direction portion the diameter contracting force is applied to the bush main body 50, it is to break the joined portion 70, and it is easy to contract the diameter of the bush main body 50. Due thereto, the ability to assemble the bush 10 to the outer anchor 40 can be improved. Further, the joined portion 70 is formed locally at a narrow portion in the axial direction and the circumferential direction of the shaft portion 52. Therefore, the formation of burrs at the joined portion 70 that is broken can be suppressed.

Further, in accordance with the bush 10 relating to the present embodiment, the connection portion 60 connects the both circumferential direction sides of the shaft portion 52. Therefore, even if the joined portion 70 is broken, the bush 10 that is assembled to the mounting hole 46 of the outer anchor 40 can cover the entirety of the mounting hole 46 in the circumferential direction. Due thereto, generation of abnormal noise between the outer anchor 40, and the bolt 48 and the bracket, can be suppressed more effectively, and corrosion that is due to the different types of metal of the outer anchor 40, and the bolt 48 and the bracket, can be suppressed effectively. Moreover, the slidability of the outer anchor 40 with respect to the bolt 48 and the bracket can be improved effectively.

Second Embodiment

A bush 90 relating to a second embodiment of the present invention is described hereinafter by using FIG. 6. Note that structural portions that are the same as those of the above-described first embodiment are denoted by the same numbers, and description thereof is omitted.

Figure 6:
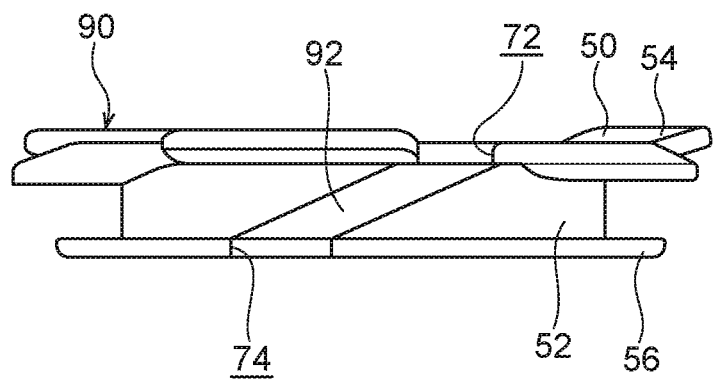
FIG. 6 is a side view of a bush relating to a second embodiment of the present invention.

As shown in FIG. 6, a connection portion 92 of the bush 90 relating to the present embodiment connects, along the circumferential direction, the circumferential direction both ends of the shaft portion 52. Further, the connection portion 92 is formed to be thinner and to have lower rigidity than the shaft portion 52.

Moreover, in accordance with the bush 90 relating to the present embodiment, due to the connection portion 92 being bendingly deformed and elastically deformed and being moved toward the inner circumferential side of the shaft portion 52, the diameter of the bush main body 50 can be elastically contracted, and the second flange portion 56 (or the first flange portion 54) can pass-through the mounting hole 46 of the outer anchor 40. Due thereto, in the present embodiment as well, operation and effects that are similar to those of the above-described first embodiment can be obtained.

Note that, at the bush 90 relating to the present embodiment, the thickness of the connection portion 92 is made to be thinner than the thickness of the shaft portion 52. However, the present invention is not limited to this, and the connection portion 92 may be structured by using a resin that is other than the resin that structures the bush 90, so that the rigidity of the connection portion 92 is lower than that of the shaft portion 52.

Note that, although the bushes 10, 90 relating to the first embodiment and the second embodiment are assembled to the outer anchor 40, the present invention is not limited to this, and the bushes 10, 90 may be assembled to the supporting shaft mounting hole 38A (mounting hole) of the shoulder anchor 38 (supporting part) or to the mounting hole of the buckle 34.

What is claimed is:

1. A bush comprising:
   a bush main body that extends in a circumferential direction of a mounting hole of a supporting part of a seatbelt device, the bush main body including a shaft portion that covers a peripheral surface of the mounting hole and a pair of flange portions that cover front and back sides of the supporting part, respectively, and, due to a mounting member being inserted-through an interior of the bush main body and being mounted to a part of a vehicle body, the supporting part is supported at the part of the vehicle body; and
   a connection portion that connects both circumferential direction sides of the bush main body such that both end portions of the shaft portion in a circumferential direction of the shaft portion are connected integrally and continuously in the circumferential direction, and allows elastic deformation of a diameter of the bush main body, and makes passage of the flange portions through the mounting hole possible.

2. The bush of claim 1, wherein elastic deformation of the diameter of the bush main body is allowed by the connection portion elastically deforming.

3. The bush of claim 1, wherein the both end portions each include an intermediate portion in an axial direction of the shaft portion, and wherein the connection portion connects only the intermediate portions of the both end portions.

4. The bush of claim 1, wherein rigidity of the connection portion is lower than that of the shaft portion.

5. The bush of claim 1, wherein cut-out portions are provided at both circumferential direction sides of the bush main body, the cut-out portions allowing both of the end portions moving in the circumferential direction due to elastic deformation of the diameter of the bush main body.

6. The bush of claim 1, wherein elastic deformation of the diameter of the bush main body is allowed by the connection portion breaking.

7. The bush of claim 6, wherein the both end portions each include an intermediate portion in an axial direction of the shaft portion, and wherein the elastic deformation of the diameter of the bush main body is allowed by the connection portion, which connects only both of the intermediate portions, breaking.

8. The bush of claim 1, wherein the connection portion connects only parts of both of the end portions that extend in an axial direction of the shaft portion.

9. The bush of claim 8, wherein dimension of the both parts in the axial direction is narrower than dimension of the shaft portion in the axial direction.

10. The bush of claim 1, wherein the connection portion is structured by using a material that is other than a material that structures the bush so that rigidity of the connection portion is lower than that of the shaft portion.

11. The bush of claim 10, wherein the connection portion is structured by using a resin that is other than a resin that structures the bush so that rigidity of the connection portion is lower than that of the shaft portion.

* * * * *